US011806699B2

(12) United States Patent
Crous et al.

(10) Patent No.: US 11,806,699 B2
(45) Date of Patent: Nov. 7, 2023

(54) OLEFIN SELECTIVE FT CATALYST COMPOSITION AND PREPARATION THEREOF

(75) Inventors: Reinier Crous, Vanderbijlpark (ZA); Tracy Carolyn Bromfield, Vanderbijlpark (ZA); Sharon Booyens, Cardiff (GB)

(73) Assignees: SASOL TECHNOLOGY (PTY.) LIMITED, Johannesburg (ZA); SASOL WAX GMBH, Hamburg (DE)

( * ) Notice: Subject to any disclaimer, the term of this patent is extended or adjusted under 35 U.S.C. 154(b) by 491 days.

(21) Appl. No.: 13/133,583

(22) PCT Filed: Dec. 4, 2009

(86) PCT No.: PCT/EP2009/008694
§ 371 (c)(1),
(2), (4) Date: Jun. 20, 2011

(87) PCT Pub. No.: WO2010/066386
PCT Pub. Date: Jun. 17, 2010

(65) Prior Publication Data
US 2012/0029096 A1 Feb. 2, 2012

(30) Foreign Application Priority Data

Dec. 8, 2008 (EP) ..................... 08021305
Dec. 8, 2008 (EP) ..................... 08021306

(51) Int. Cl.
| | | |
|---|---|---|
| *B01J 23/843* | (2006.01) | |
| *B01J 21/02* | (2006.01) | |
| *B01J 37/03* | (2006.01) | |
| *B01J 35/10* | (2006.01) | |
| *B01J 37/00* | (2006.01) | |
| *C10G 2/00* | (2006.01) | |
| *B01J 35/02* | (2006.01) | |
| *B01J 23/78* | (2006.01) | |
| *B01J 37/02* | (2006.01) | |
| *B01J 27/043* | (2006.01) | |
| *B01J 27/185* | (2006.01) | |
| *B01J 27/057* | (2006.01) | |
| *B01J 37/18* | (2006.01) | |
| *B01J 23/835* | (2006.01) | |
| *B01J 37/20* | (2006.01) | |

(52) U.S. Cl.
CPC ............. *B01J 37/03* (2013.01); *B01J 23/78* (2013.01); *B01J 23/8435* (2013.01); *B01J 27/043* (2013.01); *B01J 27/1853* (2013.01); *B01J 35/023* (2013.01); *B01J 35/1014* (2013.01); *B01J 37/009* (2013.01); *B01J 37/0045* (2013.01); *B01J 37/0201* (2013.01); *C10G 2/332* (2013.01); *B01J 21/02* (2013.01); *B01J 23/835* (2013.01); *B01J 23/843* (2013.01); *B01J 27/057* (2013.01); *B01J* *37/0036* (2013.01); *B01J 37/18* (2013.01); *B01J 37/20* (2013.01); *C10G 2400/20* (2013.01)

(58) Field of Classification Search
CPC ........................................................ C01B 17/20
USPC ........ 502/325, 328, 330, 338, 222; 518/719, 518/721
See application file for complete search history.

(56) References Cited

U.S. PATENT DOCUMENTS

| | | |
|---|---|---|
| 2,717,260 A | 9/1955 | Davis et al. |
| 4,151,190 A | 4/1979 | Murchison et al. |
| 4,199,522 A | 4/1980 | Murchison et al. |
| 4,539,334 A | 9/1985 | Murchison |
| 4,831,060 A * | 5/1989 | Stevens ..................... B01J 23/85 502/219 |
| 6,297,394 B1 | 10/2001 | Voit et al. |
| 6,486,220 B1 * | 11/2002 | Wright ................. B01J 23/8896 502/20 |
| 6,653,357 B1 | 11/2003 | Espinoza et al. |
| 7,067,562 B2 | 6/2006 | Espinoza et al. |
| 2003/0162850 A1 | 8/2003 | Espinoza et al. |
| 2004/0009871 A1 * | 1/2004 | Hu ......................... B01J 23/745 502/338 |
| 2004/0122115 A1 | 6/2004 | Espinoza et al. |

(Continued)

FOREIGN PATENT DOCUMENTS

| | | |
|---|---|---|
| DE | 19809687 A1 | 9/1999 |
| WO | 99/61144 A2 | 12/1999 |
| WO | 01/97968 A2 | 12/2001 |

OTHER PUBLICATIONS

Sulfur poisoning of cobalt and iron Fischer-Tropsch catalysts Calvin H. Bartholomew and Richard M. Bowman Applied Catalysis, V. 15, pp. 59-67, 1985.*

(Continued)

*Primary Examiner* — Douglas B Call
(74) *Attorney, Agent, or Firm* — DITTHAVONG, STEINER, & MLOTKOWSKI

(57) ABSTRACT

The present invention relates to a hydrocarbon synthesis catalyst comprising in its unreduced form a) Fe as catalytically active metal, b) an alkali metal and/or alkaline-earth metal in an alkali metal- and/or alkaline-earth metal-containing promoter, the alkali metal, c) and a further promoter comprising, or consisting of, one or more element(s) selected from the group of boron, germanium, nitrogen, phosphorus, arsenic, antimony, sulphur, selenium and tellurium, to a process for the synthesis of a hydrocarbon synthesis catalyst, to a hydrocarbon synthesis process which is operated in the present of such a catalyst and to the use of such a catalyst in a hydrocarbon synthesis process.

9 Claims, No Drawings

(56) References Cited

U.S. PATENT DOCUMENTS

2007/0142483 A1* 6/2007 White .................... C10G 2/332 518/726
2008/0015267 A1* 1/2008 Lu ......................... C10G 2/332 518/718

OTHER PUBLICATIONS

The role of sulfur in commercial iron-based Fischer-Tropsch catalsyts with focus on C2-product selectivity and yield Johan Andries Kritzinger Catalysis Today, V. 71, pp. 307-318, 2002.*
An active iron catalyst containing sulfur for Fischer-Tropsch synthesis Baoshan Wu et al. Fuel V. 83, pp. 205-212, 2004.*
Catalyst Activation by Reduction Nicola Perrnicone et al Pure and Applied Chem. v 50, pp. 1169-1191 (Year: 1978).*
Bromfield, T.C. et al., "The effect of sulfide ions on a precipitated iron Fischer-Tropsch catalyst", Applied Catalysis A: Geneal, Elsevier Science, XP004271940, Oct. 4, 1999, pp. 297-307 vol. 186(1-2), Amsterdamn, NL.
International Search Report for International Application No. PCT/EP2009/008694.
Written Opinion of the International Searching Authority and International Preliminary Report on Patentability for International Application No. PCT/EP2009/008694.
M. E. Dry, et al., "Heats of Chemisorption on Promoted Iron Surfaces and the Role of Alkali in Fischer-Tropsch Synthesis", Journal of Catalysis, (1969), vol. 15, pp. 190-199.
M.P. Kiskinova, "Adsorption of Gases on Surfaces Modified by Electronegative Adatoms", Poisoning and Promotion in Catalysis based on Surface Science Concepts and Experiments, (1991), pp. 69-168.
Gerard P. Van Der Laan et al., "Kinetics and Selectivity of the Fischer-Tropsch Synthesis: A Literature Review", Catalysis Reviews: Science and Engineering, (1999), vol. 41(3&4), pp. 255-318.
W.L. Van Dijk, et al.; "Effects of Manganese Oxide and Sulphate on the Olefin Selectivity of Iron Catalysts in the Fischer Tropsch Reaction"; Applied Catalysis; vol. 2, pp. 273-288; (1982).
Jingchang Zhang, et al.; "Effect of Several Anions on Fe-Based Catalyst for Fischer-Tropsch Synthesis"; Journal of Natural Gas Chemistry; vol. 16; No. 4; pp. 377-381; (2007).
"Material Safety Data Sheet, Ammonium Hydroxide", ScienceLab.com Chemicals & Laboratory Equipment, Last Updated May 21, 2013, pp. 1-6 (Author Unknown).
"Safety Data Sheet", Iron(III) hydroxide, alpha, Alfa Aesar—Avocado Research Chemicals, Ltd., Printed Oct. 27, 2015, pp. 1-3 (Author Unknown).
"Material Safety Data Sheet, Iron (III) nitrate nonahydrate", Creation Date: Sep. 2, 1997, pp. 1-6 (Author Unknown).
Calcination definition—UPAC Compendium of Chemical Terminology, 2014, (Author Unknown).
"Safety Data Sheet", Ammonium Nitrate, ThermoFisher SCIENTIFIC, Revision Date Jan. 18, 2018, pp. 1-7 (Author Unknown).
Zumdahl, "Chemistry", Fourth Edition, 1997, pp. 148-153, Houghton Mifflin Company, Boston, US.
"Material Safety Data Sheet, Sodium Sulfide", ScienceLab.com Chemicals & Laboratory Equipment, Last Updated May 21, 2013, pp. 1-6 (Author Unknown).
"Sodium Carbonate", PubChem Open Chemistry Database, Modified Mar. 17, 2018, pp. 1-74 (Author Unknown).

* cited by examiner

OLEFIN SELECTIVE FT CATALYST COMPOSITION AND PREPARATION THEREOF

This Application is a National Stage of International Application No. PCT/EP2009/008694 filed on Dec. 4, 2009, which claims foreign priority to EP 08021305.1 filed on Dec. 8, 2008 and EP08021306.9 filed on Dec. 8, 2008, the contents of each are hereby incorporated by reference and for which priority is claimed under 35 U.S.C. § 119.

This invention relates to a hydrocarbon synthesis catalyst comprising Fe as catalytically active metal, to a Fischer-Tropsch process in which this catalyst is used and to the use of the catalyst in a Fischer-Tropsch process.

Hydrocarbon synthesis by the Fischer-Tropsch process is known to produce a variety of products including paraffins, olefins, and oxygenates with different carbon chain lengths and isomers. One of the most serious drawbacks of the Fischer-Tropsch synthesis is that the product spectrum usually obtained is broad as predicted by the Schulz-Flory product distribution model.

The chemical industry uses as feedstock mainly short chain olefins, particularly the $C_2$-$C_4$ olefins. These olefins are normally derived from various crude oil sources. A synthetic route based on the Fischer-Tropsch technology would be highly desirable from an economic point of view as the reliance on crude oil would be eliminated.

It is known in the art that to some extent selectivity is a function of conversion, and that selectivity to lower molecular weight hydrocarbons can be enhanced by operating at process conditions for low conversion of CO. Preferred methods for lowering the conversion include increasing the space velocity and lowering the temperature. However, low conversions of valuable feed gas are undesirable for commercial applications because of low yields for the desired products.

It is also known in the art that methane production can be suppressed by dramatically lowering the $H_2$:CO ratio of the feed gas. This has the detrimental effect of increasing the selectivity for higher molecular weight hydrocarbons.

A further approach to enhance the yield of $C_2$-$C_4$ olefins in a Fischer-Tropsch synthesis without simultaneously producing large quantities of the corresponding $C_2$-$C_4$ paraffins was the development of new catalysts which selectively produce the short chain olefins and simultaneously minimize the production of short chain paraffins, especially methane.

Many catalyst examples in the art relate to improvements in the selectivity to a desirable product range of $C_2$-$C_4$ compounds. For example, in U.S. Pat. Nos. 4,199,522 and 4,151,190 a method is disclosed for increasing the selectivity to $C_2$-$C_4$ olefins by using a catalyst comprising at least one member of the group of metals, oxides or sulfides of molybdenum, tungsten, rhenium, ruthenium, nickel, palladium, rhodium, osmium, iridium, and platinum, and at least one member of the group of hydroxides, oxides, or salts of alkaline or alkaline earth metals.

In U.S. Pat. No. 4,539,334 the addition of phosphorus (in the form of a volatile phosphorous precursor) to a conventional Fischer-Tropsch catalyst is claimed to improve the selectivity of said catalyst to $C_2$-$C_4$ olefins. However, these results were obtained at relatively low conversions of CO at a $H_2$:CO ratio of ≤1.

In a study by van der Baan et al. (See Applied Catalysis, [1982]. 2, pp. 273-288) a Fe/Mn catalyst containing sulphur was prepared by impregnating the calcined Fe/Mn oxide with ammonium sulphate solution. Below 350° C. the main product of the catalyst is methane. At 350° C. the ethylene selectivity is higher than the methane selectivity. However, the methane formation can still be reduced.

In a study by Wu et al. (See Fuel, [2004], 83, pp. 205-212) a precipitated iron Fischer-Tropsch catalyst containing sulphur was prepared by using ferrous sulphate as precursor. It was shown that small amounts of sulphur may promote the catalyst by increasing activity and improving the heavier hydrocarbon selectivity.

More recently, Zhang et al. (see J. Nat. Gas Chem., [2007], 16, 377-381) studied the influence of several anions on the performance of Fe-based Fischer-Tropsch catalysts. The catalyst used in this investigation was of the composition Fe:Mn:K:activated carbon=25:20:5:50 by weight. From this study it was revealed that the addition of 500 ppm of anions lowered the catalytic activity of the catalyst for Fischer-Tropsch synthesis as well as the yield of light olefins. The selectivity for methane was also lowered by the presence of the anions.

WO 01/97968 discloses the preparation of an iron-based precipitated FT catalyst. The calcined catalyst of Example 2 includes "impurity levels" of 0.03 g $SO_4$/100 g Fe, which translates to 0.01 g S/100 g Fe. It is shown that the catalyst had only a low selectivity to $C_2$-$C_4$ olefins with high methane selectivity.

Finally, in U.S. Pat. No. 6,653,357 a method for conducting a high temperature Fischer-Tropsch synthesis is disclosed with which the selectivity profile of the lower olefins is improved by injecting a promoter-carrying compound directly into the reactor medium thereby counteracting the poisonous effect of sulphur.

However, in spite of the various approaches to obtain an improved yield of short chain products described above there is still the need for improved Fischer-Tropsch catalysts tailored to produce a high amount of $C_2$-$C_4$ products, especially $C_2$-$C_4$ olefins, while keeping the methane formation at a low level.

It is thus the object of the present invention to provide a hydrocarbon synthesis catalyst has an improved selectivity for $C_2$-$C_4$ products, especially $C_2$-$C_4$ olefins, with simultaneous suppression of excess methane formation. Simultaneously, the catalyst should have high activity and should allow for high CO conversion rates.

Surprisingly, it has now been found that such a catalyst can be provided if it contains Fe as catalytically active metal, an alkali and/or alkaline earth metal promoter and, in addition, a further promoter which is selected from the group of non-metals and semi-metals (Metalloids) found in groups 13 to 16 of the Periodic Table of the Elements.

The present invention therefore provides a hydrocarbon synthesis, especially a Fischer-Tropsch synthesis, catalyst comprising in its unreduced form
  a) Fe as catalytically active metal,
  b) an alkali metal and/or alkaline-earth metal in an alkali metal- and/or alkaline-earth metal-containing promoter, the alkali metal and/or alkaline-earth metal being present in an amount of from 0.1 to 1.0 g/100 g Fe,
  c) and a further promoter comprising, or consisting of, one or more element(s) selected from the group of boron, germanium, nitrogen, phosphorus, arsenic, antimony, sulphur, selenium and tellurium, the element(s) being present in an amount of from 0.03 to 0.2 g/100 g Fe, and
wherein the catalyst in its unreduced form has a surface area of 80 m²/g or less.

The catalyst allows for a dramatic increase in selectivity to light hydrocarbons with a simultaneous suppression of the expected increase in methane formation when used in hydrocarbon synthesis, especially Fischer-Tropsch synthesis, in which a feed gas composed of $H_2$ and at least one carbon oxide is converted at elevated temperature and pressure.

Furthermore, the light fraction of the obtained hydrocarbons consist mostly of valuable olefins and alcohols with minimal paraffin formation. Still further, the catalyst shows a good activity and synthesis gas conversion.

Finally, due to its surface area, the catalyst is especially well suited for high temperature hydrocarbon synthesis processes.

The catalyst in its unreduced form preferably has a surface area of 50 $m^2/g$ or less, more preferably less than 50 $m^2/g$, even more preferably 40 $m^2/g$ or less, and more preferably of 35 $m^2/g$ or less.

Furthermore, the catalyst in its unreduced form preferably has a surface area of 10 $m^2/g$ or more, more preferably of 25 $m^2/g$ or more.

The amount of Fe in the unreduced form of the catalyst preferably is from 60 to 80 wt %, more preferably from 65 to 75 wt. %. The balance in the unreduced form of the catalyst, excluding Fe and promoters, may be made up of oxygen, so that Fe is present in the catalyst in the form of iron oxides, preferably in the form of hematite.

The catalyst in its reduced form preferably has a surface area of not more than 30 $m^2/g$, more preferably of not more than 20 $m^2/g$, and most preferably of not more than 10 $m^2/g$. Usually, the surface area of the catalyst in its reduced form is not less than 1 $m^2/g$.

The amount of Fe in the reduced form of the catalyst preferably is from 50 to 99.0 wt %, more preferably from 60 to 90 wt. %. The balance in the reduced form of the catalyst, excluding Fe and promoters, may be made up of carbon in the form of carbide.

Preferably, Fe is the only catalytically active metal in the catalyst.

The catalyst preferably comprises, more preferably is, a precipitated catalyst, but it may also comprise or be a fused catalyst. The precipitated catalyst preferably comprises a precipitated catalyst as described in WO 01/97968 A2.

The alkali metal- and/or alkaline-earth metal-containing promoter may contain more than one type of alkali metal- and/or alkaline-earth metal. The alkali metal- and/or alkaline-earth metal-containing promoter of the catalyst usually is in the form of an alkali metal oxide and/or alkaline-earth metal oxide.

Preferably, the alkali metal in the alkali metal-containing promoter is Na or K, and hence the alkali metal-containing promoter preferably comprises potassium oxide or sodium oxide.

Preferably, the alkaline-earth metal in the alkaline-earth metal-containing promoter is Ca or Mg.

Preferably, the alkali metal and/or alkaline-earth metal in the alkali metal- and/or alkaline-earth metal-containing promoter is/are present in the unreduced form of the catalyst in an amount of from 0.01 to 1.0 g/100 g Fe, more preferably in an amount of from 0.06 to 0.8 g/100 g Fe and most preferably in an amount of 0.1 to 0.6 g/100 g Fe.

The alkali metal- and/or alkaline-earth metal-containing promoter can be added to the iron by means of various methods, such as impregnation of the iron with the alkali metal- or alkaline-earth metal-containing promoter, co-precipitating the alkali metal- or alkaline-earth metal-containing promoter, fusing the iron and the alkali metal- or alkaline-earth metal-containing promoter, addition of the alkali metal- or alkaline-earth metal-containing promoter directly to the reaction zone, etc.

In addition to the alkali metal- and/or alkaline-earth metal-containing promoter, the catalyst contains at least one further promoter which contains, or consists of, one or more element(s) selected from the group of boron, germanium, nitrogen, phosphorus, arsenic, antimony, sulphur, selenium and tellurium.

In an embodiment of the invention the alkali metal- or alkaline-earth metal-containing promoter and the at least one further promoter are chemically bound to another, in the form of a single compound. Preferably in this embodiment, the single compound is NaS.

In one preferred embodiment of the invention the further promoter which contains, or consists of, one or more element(s) selected from the group of boron, germanium, nitrogen, phosphorus, arsenic, antimony, sulphur, selenium and tellurium comprises, or consists of, one or more element(s) selected from the group of boron, phosphorus, antimony and sulphur, and most preferably comprises, or consists of, sulphur.

In case the further promoter consists of sulphur, the precursor may be ammonium sulphate, but other sulphur precursors may also be used.

Preferably, the element(s) in the further promoter comprising one or more element(s) selected from the group of boron, germanium, nitrogen, phosphorus, arsenic, antimony, sulphur, selenium and tellurium is(are) present in the catalyst in an amount of from 0.05 to 0.15 g/100 g Fe.

Preferably, in the unreduced form of the catalyst according to invention the weight ratio between the alkali metal and/or alkaline-earth metal in the alkali metal- and/or alkaline-earth metal-containing promoter and the element(s) in the further promoter comprising one or more element(s) selected from the group of boron, germanium, nitrogen, phosphorus, arsenic, antimony, sulphur, selenium and tellurium is from 0.5:1 to 50:1, more preferably is from 0.5:1 to 33:1 and most preferably is from 0.8:1 to 20:1.

In addition to the promoters described above, the catalyst may also contain other promoters. Certain promoters, for example Al, Ti or Cr, can be added as promoters to the catalyst. Binders, such as silica or alumina, may also be added in case of a spray-dried catalyst.

If the process is to be performed in a fluidised bed reactor, the final catalyst may be produced by means of a variety of known methods in order to obtain particles with acceptable fluidisation properties, such as crushing, spray-drying, etc. In order to obtain a particle size distribution suitable for fluidisation, the catalyst may be classified by means of known methods, such as sieving, cyclone classification etc.

The unreduced catalyst preferably is in a particulate form in which more than 90 wt. % of the particles have a particle size in the range of 10 to 250 μm, preferably have a particle size in the range of 20 to 180 μm and most preferably have a particle size in the range of 38 to 150 μm.

The catalyst may be brought into the desired particulate form by crushing and sieving.

Preferably, the catalyst is an unsupported catalyst.

The present invention furthermore relates to a hydrocarbon synthesis process, especially a Fischer-Tropsch process, which is operated in the presence of a catalyst according to any of the above described embodiments, wherein the catalyst is in its reduced form.

It will be appreciated that if the catalyst is still in its unreduced form, it is reduced prior to or upon initiation of the hydrocarbon synthesis, especially Fischer-Tropsch, reaction, to provide the catalyst in its reduced form.

The reduction of the catalyst may be carried out in-situ. In this context "in-situ" denotes that the catalyst is placed in the reaction zone of the hydrocarbon synthesis process, e.g. a fluidized bed reactor or a fixed fluidized bed reactor, and reduced before the hydrocarbon synthesis reaction conditions are applied to said reaction zone.

Preferably, the reduction is carried out using $H_2$ and/or CO as reducing gas, more preferably $H_2$ is used as reducing gas.

Preferably the reduction is carried out at a temperature of at least 200° C., more preferably of at least 275° C., still more preferably of at least 300° C., still more preferably of at least 350° C., and most preferably of at least 380° C.

The reduction is preferably carried out at a temperature of not more than 800° C., more preferably of not more than 650° C. and most preferably of not more than 500° C.

Preferably, the reduction is carried out for at least 8 hours, more preferably for at least 11 hours and most preferably for at least 14 hours.

The reduction is preferably carried out for at most 24 hours, more preferably for at most 21 hours and most preferably for at most 18 hours.

Preferably, the reduction is carried out at a pressure of at least 1.0 MPa, more preferably of at least 1.3 MPa and most preferably of at least 1.6 MPa.

The reduction is preferably carried out at a pressure of not more than 3.0 MPa, more preferably of not more than 2.7 MPa and most preferably of not more than 2.4 MPa.

During the reduction step, at least some of the Fe is reduced from e.g. an Fe-oxide to Fe in the zero oxidation state. Preferably, at least 75 wt. % of the Fe is reduced to Fe in the zero oxidation state.

It will be appreciated that the concentrations of the alkali metal and/or alkaline earth metal in the alkali metal- and/or alkaline-earth metal-containing promoter and the element(s) in the further promoter comprising one or more element(s) selected from the group of boron, germanium, nitrogen, phosphorus, arsenic, antimony, sulphur, selenium and tellurium are not changed during the reduction step, as these are expressed as g/100 g Fe.

Preferably, the hydrocarbon synthesis process is a high temperature process, more preferably is a high temperature Fischer-Tropsch process.

The high temperature hydrocarbon synthesis process is usually carried out at a temperature of 250° C. or higher, more preferably of 280° C. or higher, and most preferably of 300° C. or higher.

Preferably, the process is carried out at a temperature of 450° C. or lower, more preferably of 400° C. or lower, and most preferably of 360° C. or lower.

The total pressure in the reaction zone preferably is 5 bar or higher, more preferably is 10 bar or higher, and most preferably is 15 bar or higher.

Preferably, the total pressure is 60 bar or lower, more preferably is 50 bar or lower, still more preferably is 40 bar or lower, and most preferably is 30 bar or lower.

The high temperature hydrocarbon synthesis process can be described as a two-phase process. At the temperatures and pressures used for this process both reactants and the products are in the gas phase in the reaction zone, and the catalyst, which is a solid, forms the second phase.

The applicant has further observed that under the preferred high temperature Fischer Tropsch reaction conditions described hereinbefore, the catalyst produces remarkably low levels of free carbon. High levels of free carbon formation is a known disadvantage associated with commercial high temperature Fischer Tropsch processes, which leads to carbon deposition on the catalyst surface and therefore deactivation of the catalyst. As a result, commercial processes employ fluidized bed reactors to avoid blocking of the catalyst bed.

In a preferred embodiment of this invention, the hydrocarbon synthesis process, preferably the Fischer Tropsch process is conducted in a stationary bed reactor.

The stationary bed reactor may define a zone wherein the catalyst is held stationary within the reactor. The zone may be defined by a first and second screen, carrying the catalyst, wherein the apertures of the screens are too small for the catalyst particles to pass through.

The stationary reactor may be a fixed bed reactor or a fixed-fluidised bed reactor, but preferably, the stationary bed reactor is a fixed bed reactor.

Preferably, the feed gas in the process comprises at least one carbon oxide, more preferably comprises CO. The carbon oxide may comprise a mixture of CO and $CO_2$.

Furthermore, the feed gas preferably comprises $H_2$.

It is typical for the Fischer-Tropsch process that the feed gas both contains $H_2$ and carbon monoxide.

Preferably, the $H_2$:carbon oxide molar ratio may be as low as possible at or above the ratio of 2. However, it may be higher than 2:1, e.g. 2.5, and even as high as 3:1, or even higher than 3:1.

The $H_2$ and carbon oxide feed is known as synthesis feed gas and it may also include other components, such as water vapour, Ar, $CH_4$, light hydrocarbons, etc.

The invention also relates to the use of a catalyst in any of the above described embodiments in a hydrocarbon synthesis process, especially in a Fischer-Tropsch process.

It is further the object of the present invention to provide a process for the preparation of a hydrocarbon synthesis catalyst which has an improved selectivity for $C_2$-$C_4$ products, especially $C_2$-$C_4$ olefins, with simultaneous suppression of excess methane formation. Simultaneously, the catalyst should have high activity and should allow for high CO conversion rates.

It has surprisingly been found that such a catalyst can be provided by a process in which a catalyst is produced which contains iron as a catalytically active metal, an alkali metal and/or alkaline-earth metal containing promoter and, in addition, a further promoter which is selected from the group of non-metals and semi-metals (Metalloids) found in groups 13 to 16 of the Periodic Table of the Elements and which is incorporated into the catalyst before calcination.

The present invention therefore provides a process for the preparation of a hydrocarbon synthesis catalyst, especially a Fischer-Tropsch catalyst, comprising the following steps:

(a) providing a solution of iron or a suspension of a precipitated, non-calcined iron-containing solid in a solvent in which a precursor of a promoter P1 is present, the promoter P1 comprising, or consisting of, one or more element(s) selected from the group of boron, germanium, nitrogen, phosphorus, arsenic, antimony, sulphur, selenium and tellurium, (b) removing the solvent from the solution or suspension, and (c) subjecting the product of step (b) to a calcination treatment, wherein the amount of the precursor of promoter P1 is selected so that the one or more element(s) selected from boron, germanium, nitrogen, phosphorus, arsenic, antimony, sulphur, selenium and tellurium is(are) present in an amount of at least 0.02 g/100 g Fe in the catalyst, and a precursor of an alkali metal- and/or alkaline earth metal containing promoter P2 is added before, after or during any of the steps of the process so that promoter P2 is present in the catalyst.

Unless otherwise mentioned the term "iron" as used herein is intended to denote iron in any of its oxidation states, i.e. including $Fe^{2+}$ and $Fe^{3+}$. A solution of iron as mentioned herein will usually comprise iron in one of its ionic forms.

The term "precursor of promoter" includes the exceptional case in which the precursor and the promoter derived therefrom and present in the catalyst in its reduced form have the same chemical composition.

The catalyst obtainable by the process according to the invention allows for a dramatic increase in selectivity to light hydrocarbons with a simultaneous suppression of the expected increase in methane formation when used in hydrocarbon synthesis, especially Fischer-Tropsch synthesis, in which a feed gas composed of $H_2$ and at least one carbon oxide is converted at elevated temperature and pressure. Furthermore, the light fraction of the obtained hydrocarbons consists mostly of valuable olefins and alcohols with minimal paraffin formation. Still further, the catalysts show a good activity and synthesis gas conversion.

The solvent is removed in step (b) to such an extent that a dry or wet solid, or a slurry is obtained. In any case, in the solid thus formed the precursor of promoter P1 and iron are homogenously distributed and, hence, also in the final catalyst structure promoter P1 is homogeneously distributed, i.e. not only attached to the surface.

Preferably, the solid or slurry obtained in step (b) is, after optional further drying, directly subjected to step (c) without that any further intermediate steps are performed.

However, the solid or slurry obtained in step (b) may also be re-suspended in a solvent or impregnated with a liquid before it is, after optional further drying, subjected to step (c).

Preferably, the solvent present in the solution or suspension of step (a) is an aqueous solvent.

The solution of iron in a solvent in step (a) may be prepared in any known manner.

The solution of iron in a solvent may be formed by dissolving an iron salt in the solvent, preferably aqueous solvent, said iron salt is preferably selected from iron nitrate, iron acetate, iron oxalate, iron sulphate, iron chloride, their hydrates and mixtures thereof, more preferably the iron salt is iron nitrate or a hydrate thereof, and most preferably the iron salt is iron nitrate nonahydrate ($Fe(NO_3)_3 \cdot 9\ H_2O$).

The solution comprising iron may also be formed by dissolving a compound comprising at least 90 wt.-% elemental iron, more preferably at least 95 wt.-% elemental iron, even more preferably at least 98 wt.-% elemental iron and most preferably 99.5 wt.-% elemental iron in an aqueous acid.

Preferably, said aqueous acid is selected from aqueous inorganic acids, more preferably selected from aqueous solutions of nitric acid, sulphuric acid, hydrochloric acid or mixtures thereof and most preferably, the acid is nitric acid.

Preferably, said aqueous inorganic acid has a concentration of at least 15 wt. % in water, more preferably of at least 50 wt. % in water and most preferably of at least 60 wt. % in water.

Said aqueous inorganic acid preferably has a concentration of not more than 90 wt. % in water, more preferably not more than 80 wt. % in water.

In a preferred embodiment of the process of the invention, in step (a) a solution of iron in a solvent is provided in which a precursor of a promoter P1 is present, and then a suspension is obtained by forming a precipitate containing iron and the precursor of promoter P1 from the solution before step (b) is carried out.

The precipitation from an iron-solution containing a precursor of promoter P1 is a co-precipitation wherein besides iron at least a part of the precursor of promoter P1 is present in the precipitate.

The precipitation may be effected by reduction of the temperature or by using a precipitant.

Preferably, the precipitation is effected using a precipitant, i.e. a chemical agent which initiates precipitation.

The precipitation may be effected by addition of the solution containing iron and the precursor of promoter P1 to the precipitant or, preferably, by addition of the precipitant to the solution containing iron the precursor of promoter P1.

In the embodiment wherein in step (a) an aqueous solvent is used, the precipitation is preferably effected by the addition of an alkaline compound or a solution thereof to the solution containing iron and the precursor of promoter P1. More preferably, the precipitant is selected from solutions, preferably aqueous solutions, of alkaline compounds, more preferably is selected from solutions of hydroxides, even more preferably selected from solutions of alkali metal hydroxides, ammonium hydroxide or mixtures thereof and most preferably is a solution of ammonium hydroxide.

Preferably, the precipitant is used in an amount so that a pH value of the solvent of at least 5.0, more preferably at least 6.0 and most preferably of at least 6.5 is attained.

Furthermore, preferably the pH value obtained by the addition of the precipitant does not exceed 9.0, more preferably does not exceed 8.0 and most preferably does not exceed 7.5.

The precipitation is preferably carried out at a temperature of at least 0° C., more preferably of at least 10° C. and most preferably of at least 20° C.

Preferably, the precipitation is carried out at a temperature of not more than 100° C., more preferably of not more than 70° C. and most preferably of not more than 40° C.

Preferably, at least 80 mol %, more preferably at least 90 mol % and most preferably at least 95 mol % of the iron in the precipitate is present in the form of ferrihydrite.

In case a suspension of a precipitated, non-calcined iron-containing solid in a solvent is used in step (a), this suspension may be prepared in any known manner, for example by precipitating the solid from an iron solution by the use of a precipitating agent and the so-prepared suspension is used in step (a). In particular, the suspension can be prepared in according to any embodiments of the precipitation process of the invention described above.

However, it is also possible that the suspension of a precipitated, non-calcined iron-containing solid in a solvent is prepared by providing a solution of iron in a solvent followed by forming a precipitate containing iron from the solution, removing the solvent to obtain a dry or wet solid, or a slurry, and then re-suspending the solid in a solvent.

In any case, the precipitated iron-containing solid must be non-calcined, i.e. must not have been subjected to a calcination treatment where heat is applied to the solid in an oxygen atmosphere so that iron oxides are formed in the solid.

Usually, a calcination treatment is performed at a temperature of at least 200° C. for a time of at least ½ hour.

The removal of the solvent in step (b) may be effected by spray-drying or, preferably, by evaporating the solvent by the application of heat, i.e. by heating.

In a typical spray-drying operation, the solution or suspension is pumped into the chamber of the spray-drying apparatus through an atomizer or series of atomizers. The simplest type is a single fluid atomizer in which the solution or suspension to be dried is pumped at high pressures through small nozzles. A more complex atomizer is a spinning disk system in which the solution or suspension to be dried is carefully fed onto a disk that is spinning at 10,000-30,000 rpm. The high speed rotation causes the liquid to thin and form droplets at the edge of the disk. A third commonly used method for atomization is a two-fluid nozzle. In this case, there are two closely spaced nozzles. One nozzle is used to deliver the solution or suspension and the second nozzle directs gas at high pressure onto the liquid stream causing it to atomize. In all cases, the atomized liquid is then dried by the hot gas flowing through the drying chamber.

For rapid drying, a high inlet temperature is desired, although thermal stability of the product or limitations on the air heaters supplying the hot air limits the upper end of inlet temperatures. For most drying, the outlet temperature provides a measure of the final product temperature and an indication of the utilization of the energy in the inlet air for drying. Clearly, for the most economical drying, a low outlet temperature would be desired. However, in many instances, a low outlet temperature leaves the product with a moisture content that is too high.

Preferably, the outlet temperature is not more than 180° C., more preferably not more than 160° C. and even more preferably not more than 140° C.

The outlet temperature is preferably at least 80° C., more preferably at least 95° C., even more preferably at least 110° C.

The inlet temperature is preferably not more than 500° C., more preferably not more than 450° C. and most preferably not more than 400° C.

Preferably, the inlet temperature is at least 250° C., more preferably at least 300° C.

Preferably, spray-drying is performed at a pressure of at least 5.0 MPa, more preferably of at least 10 MPa and most preferably of at least 15 MPa.

Spray-drying is preferably performed at a pressure of not more than 40.0 MPa, more preferably of not more than 30 MPa and most preferably of not more than 25 MPa before subjected to spray-drying.

A carrier gas may be used in spray-drying. Preferably, said carrier gas is selected from air, He, Ne, Ar, Kr, Xe, $N_2$, or mixtures thereof and most preferably from air or nitrogen.

If spray-drying is used in step (b), it is preferred that a solution comprising iron and the precursors of promoters P1 and P2 is prepared in step (a) and is then spray-dried in step (b).

In the preferred option of the removal of the solvent in step (b) by heating, the temperature is preferably at least 110° C., more preferably at least 120° C. and most preferably at least 130° C.

Furthermore, the heating temperature preferably is not higher than 200° C., more preferably is not higher than 150° C. and most preferably is not higher than 140° C.

Heating is preferably carried out for at least 9 hours, more preferably for at least 12 hours and most preferably for at least 14 hours.

Preferably, heating is carried out for not more than 25 hours, more preferably for not more than 20 hours, and most preferably for not more than 18 hours.

Preferably, in the process of the invention, the calcination treatment in step (c) is performed at a temperature of 200° C. or more, more preferably at a temperature of 250° C. or more and most preferably at a temperature of 300° C. or more.

The temperature in the calcination treatment in step (c) preferably is not higher than 600° C., more preferably is not higher than 500° C. and most preferably is not higher than 450° C.

The calcination treatment in step (c) is preferably carried out for at least 30 min, more preferably for at least 1.0 hour, even more preferably for at least 2.0 hours and most preferably for at least 3.0 hours.

Preferably, the calcination treatment in step (c) is performed for at most 8.0 hours, preferably at most 6.0 hours, and most preferably at most 5.0 hours.

Preferably, the surface area of the product subjected to the calcination treatment in step (c) is at least 50 $m^2/g$ and more preferably is at least 80 $m^2/g$ before step (c) is carried out. Furthermore, preferably, the surface area of the product subjected to the calcination treatment in step (c) is not higher than 500 $m^2/g$.

In the calcination treatment in step (c), usually the surface area of the treated product is lowered. Furthermore, as a calcination treatment is carried out in the presence of an oxygen atmosphere, e.g. in air, iron oxides are formed in the treated product.

After the calcination treatment in step (c), the catalyst is obtained (in unreduced form).

The surface area of the catalyst in its unreduced form is preferably 80 $m^2/g$ or less, more preferably is 50 $m^2/g$ or less, still more preferably less than 50 $m^2/g$, still more preferably is 40 $m^2/g$ or less, and most preferably is 35 $m^2/g$ or less.

Furthermore, the catalyst in its unreduced form preferably has a surface area of 10 $m^2/g$ or more, more preferably of 25 $m^2/g$ or more.

Preferably, after calcination step (c) at least 80 mol %, more preferably at least 90 mol % and most preferably at least 95 mol % of the iron contained in the catalyst in its unreduced form is in the form of hematite.

Preferably, the process of the invention further comprises the following step (d) after step (c):

(d) the product of step (c) is brought into a particulate form in which more than 90 wt. % of the particles have a particle size in the range of 10 to 250 μm, preferably have a particle size in the range of 20 to 180 μm and most preferably have a particle size in the range of 38 to 150 μm.

Step (d) is preferably carried out by crushing the product of step (c) and sieving it to the desired particle distribution.

In the process of the invention, the precursor of an alkali metal- and/or alkaline earth metal containing promoter P2 may be added to the catalyst precursor at any stage of the process.

For example, the precursor of promoter P2 may be present in the solution or the suspension of step (a) before step (b) is carried out; and/or added to the product of step (b) before step (c) is carried out; and/or added to the catalyst in its unreduced form after step (c) or (d)

Preferably, the precursor of promoter P2 is added before step (c) is carried out, more preferably, the precursor of promoter P2 is added before step (b) is carried out.

In the preferred embodiment of the process of the invention wherein in step (a) a solution of iron in a solvent is provided in which a precursor of a promoter P1 is present, and then a suspension is obtained by forming a precipitate containing iron and the precursor of promoter P1 from the solution before step (b) is carried out, preferably, the precursor of promoter P2 is added to the suspension containing the precipitate before step (b) is carried out, i.e. preferably the process of the invention comprises the following steps:
- (a) providing a solution comprising iron and a precursor of a promoter P1, the promoter P1 comprising, or consisting of, one or more element(s) selected from the group of boron, germanium, nitrogen, phosphorus, arsenic, antimony, sulphur, selenium and tellurium, in a solvent, obtaining a suspension by forming a precipitate containing iron and the precursor of promoter P1 from the solution, and adding a precursor of an alkali metal- and/or alkaline-earth metal containing promoter P2 to the suspension;
- (b) removing the solvent from the suspension; and
- (c) subjecting the product of step (b) to a calcination treatment.

In addition to the promoters described above, the catalyst may also contain other promoters. Thus, the precursors of certain promoters, for example Al, Ti and Cr may be added during the preparation process of the invention.

However, preferably, no further promoters besides P1 and P2 or their precursors are added after the calcination treatment in step (c). More preferably, no promoters besides P1 and P2 or their precursors at all are added during the preparation process of the invention.

Preferably, in the catalyst obtainable by the process of the invention Fe is the only metal which is catalytically active for hydrocarbon synthesis. Thus, preferably, no additional catalytically active metal or one of its precursors is added during the preparation process of the invention.

Preferably, promoter P1 comprises, or consists of, one or more element(s) selected from the group of boron, phosphorus, antimony and sulphur, more preferably, comprises, or consists of sulphur.

In case promoter P1 comprises, or consists of, sulphur, the precursor may be ammonium sulphate, but other sulphur precursors may also be used.

Preferably, the amount of the precursor of promoter P1 is selected such that the element(s) selected from boron, germanium, nitrogen, phosphorus, arsenic, antimony, sulphur, selenium and tellurium is(are) present in an amount of at least 0.02 g/100 g Fe, more preferably of at least 0.025 g/100 g Fe, even more preferably of at least 0.03 g/100 g Fe and most preferably of at least 0.05 g/100 g Fe in the catalyst.

Preferably, the amount of the precursor of promoter P1 is selected such that the element(s) selected from boron, germanium, nitrogen, phosphorus, arsenic, antimony, sulphur, selenium and tellurium is(are) present in an amount of not more than 0.25 g/100 g Fe, more preferably of not more than 0.20 g/100 g Fe and most preferably of not more than 0.15 g/100 g Fe in the catalyst.

The precursor of the promoter P2 is preferably selected from sodium hydroxide, sodium carbonate, sodium oxide, potassium hydroxide, potassium carbonate, potassium oxide, caesium hydroxide, caesium carbonate, caesium oxide or mixtures thereof, more preferably, is selected from sodium hydroxide, sodium carbonate, sodium oxide or mixtures thereof and most preferably is sodium carbonate.

The alkali metal- and/or alkaline-earth metal-containing promoter may contain more than one type of alkali metal- and/or alkaline-earth metal. The alkali metal- and/or alkaline-earth metal-containing promoter of the catalyst usually is in the form of an alkali metal oxide and/or alkaline-earth metal oxide.

Preferably, the alkali metal in the alkali metal-containing promoter is Na or K, and hence the alkali metal-containing promoter preferably comprises potassium oxide or sodium oxide.

Preferably, the alkaline-earth metal in the alkaline-earth metal-containing promoter is Ca or Mg.

Preferably, the amount of the precursor of promoter P2 is selected such that the alkali metal and/or alkaline-earth metal is/are present in an amount of at least 0.01 g/100 g Fe, more preferably of at least 0.02 g/100 g Fe, more preferably of at least 0.06 g/100 g Fe and most preferably of at least 0.10 g/100 g Fe in the catalyst.

Preferably, the amount of the precursor of promoter P2 is selected such that the alkali metal and/or alkaline-earth metal is/are present in an amount of not more than 1.0 g/100 g Fe, more preferably of not more than 0.80 g/100 g Fe and most preferably of not more than 0.60 g/100 g Fe in the catalyst.

In an embodiment of the invention the alkali metal- or alkaline-earth metal-containing promoter and the at least one further promoter are chemically bound to another, in the form of a single compound. Preferably in this embodiment, the single compound is NaS.

Preferably, the weight ratio between the total of alkali metal and/or alkaline-earth metal of promoter P2 and the element(s) selected from boron, germanium, nitrogen, phosphorus, arsenic, antimony, sulphur, selenium and tellurium of promoter P1 in the catalyst is from 0.1:1 to 50:1, more preferably is from 0.5:1 to 33:1 and most preferably is from 0.8:1 to 20:1.

The catalyst obtained through the process of the invention after step (c) or step (d) is still in unreduced form and has to be reduced before being usable for hydrocarbon synthesis.

The reduction of the catalyst may be carried out in-situ. In this context "in-situ" denotes that the catalyst is placed in the reaction zone of the hydrocarbon synthesis process, e.g. a fluidized bed reactor or a fixed fluidized bed reactor, and reduced before the hydrocarbon synthesis reaction conditions are applied to said reaction zone.

Preferably, the reduction is carried out using $H_2$ and/or CO as reducing gas, more preferably $H_2$ is used as reducing gas.

Preferably the reduction is carried out at a temperature of at least 200° C., more preferably of at least 275° C., still more preferably of at least 300° C., still more preferably of at least 350° C., and most preferably of at least 380° C.

The reduction is preferably carried out at a temperature of not more than 800° C., more preferably of not more than 650° C. and most preferably of not more than 500° C.

Preferably, the reduction is carried out for at least 8 hours, more preferably for at least 11 hours and most preferably for at least 14 hours.

The reduction is preferably carried out for at most 24 hours, more preferably for at most 21 hours and most preferably for at most 18 hours.

Preferably, the reduction is carried out at a pressure of at least 1.0 MPa, more preferably of at least 1.3 MPa and most preferably of at least 1.6 MPa.

The reduction is preferably carried out at a pressure of not more than 3.0 MPa, more preferably of not more than 2.7 MPa and most preferably of not more than 2.4 MPa.

During the reduction step, at least some of the Fe is reduced from e.g. an Fe-oxide to Fe in the zero oxidation state. Preferably, at least 75 wt. % of the Fe is reduced to Fe in the zero oxidation state.

It will be appreciated that the concentrations of the alkali metal and/or alkaline earth metal in the alkali metal- and/or alkaline-earth metal-containing promoter and the element(s) in the further promoter comprising one or more element(s) selected from the group of boron, germanium, nitrogen, phosphorus, arsenic, antimony, sulphur, selenium and tellurium are not changed during the reduction step, as these are expressed as g/100 g Fe.

The catalyst in its reduced form preferably has a surface area of not more than 30 m²/g, more preferably of not more than 20 m²/g, and most preferably of not more than 10 m²/g. Usually, the surface area of the catalyst in its reduced form is not less than 1 m²/g.

The amount of Fe in the catalyst in its reduced form preferably is from 50 to 99.0 wt %, more preferably from 60 to 90 wt. %. The balance in the reduced form of the catalyst, excluding Fe and promoters, may be made up of carbon in the form of carbide.

Preferably, the catalyst is an unsupported catalyst, thus, preferably no catalyst support is added during the preparation process.

Preferably, in the catalyst in its reduced form promoter P2 is in the form of an alkali metal oxide and/or an alkaline-earth metal oxide.

The hydrocarbon synthesis catalyst of the present invention according to any of the above embodiments is obtainable by the process according to the present invention.

The invention is furthermore directed to a hydrocarbon synthesis catalyst obtainable according to any of the above described embodiments of the process for the preparation of the catalyst of the invention.

Still further, the present invention is directed to a hydrocarbon synthesis process, especially a Fischer-Tropsch process, in the presence of the catalyst obtainable by the process of the invention in any of the above described embodiments, and to the use of the catalyst obtainable by the process of the invention in such a hydrocarbon synthesis, especially Fischer-Tropsch, process.

Preferably, the hydrocarbon synthesis process is a high temperature process, more preferably is a high temperature Fischer-Tropsch process.

The high temperature hydrocarbon synthesis process is usually carried out at a temperature of 250° C. or higher, more preferably of 280° C. or higher, and most preferably of 300° C. or higher.

Preferably, the process is carried out at a temperature of 450° C. or lower, more preferably of 400° C. or lower, and most preferably of 360° C. or lower.

The total pressure in the reaction zone preferably is 5 bar or higher, more preferably is 10 bar or higher, and most preferably is 15 bar or higher.

Preferably, the total pressure is 60 bar or lower, more preferably is 50 bar or lower, still more preferably is 40 bar or lower, and most preferably is 30 bar or lower.

The high temperature hydrocarbon synthesis process can be described as a two-phase process. At the temperatures and pressures used for this process, both reactants and the products are in the gas phase in the reaction zone, and the catalyst, which is a solid, forms the second phase.

The applicant has further observed that under the preferred high temperature Fischer Tropsch reaction conditions described hereinbefore, the catalyst produces remarkably low levels of free carbon. High levels of free carbon formation is a known disadvantage associated with commercial high temperature Fischer Tropsch processes, which leads to carbon deposition on the catalyst surface and therefore deactivation of the catalyst. As a result, commercial processes employ fluidized bed reactors to avoid blocking of the catalyst bed.

In a preferred embodiment of this invention, the hydrocarbon synthesis process, preferably the Fischer Tropsch process is conducted in a stationary bed reactor.

The stationary bed reactor may define a zone wherein the catalyst is held stationary within the reactor. The zone may be defined by a first and second screen, carrying the catalyst, wherein the apertures of the screens are too small for the catalyst particles to pass through.

The stationary reactor may be a fixed bed reactor or a fixed-fluidised bed reactor, but preferably, the stationary bed reactor is a fixed bed reactor.

Preferably, the feed gas in the hydrocarbon synthesis process comprises at least one carbon oxide, more preferably comprises CO. The carbon oxide may comprise a mixture of CO and $CO_2$.

Furthermore, the feed gas preferably comprises $H_2$.

It is typical for a Fischer-Tropsch process that the feed gas both contains $H_2$ and carbon monoxide.

Preferably, the $H_2$:carbon oxide molar ratio is higher than 2:1, e.g. between 2.5:1 and 3:1, or may even be higher than 3:1.

The $H_2$ and carbon oxide feed is known as synthesis feed gas and it may also include other components, such as water vapour, Ar, $CH_4$, light hydrocarbons, etc. The present invention is furthermore directed to a process comprising
  a hydrocarbon synthesis process which is operated in the presence of a hydrocarbon synthesis catalyst of the present invention according to any of the above embodiments or of a hydrocarbon synthesis catalyst obtainable according to any of the above described embodiments of the process for the preparation of the catalyst of the invention, wherein the catalyst is in its reduced form; and
  further processing of the obtained hydrocarbon product.

The invention will now be described by means of the following non-limiting examples.

EXAMPLES

1. Methods 1.1 Surface Area

Surface Area measurements were done using a Micromeritics Tristar 3000. Samples were degassed under dynamic nitrogen flow at 200° C. for a minimum time of 12 hours. Thereafter 250-300 mg of sample were accurately weighed out and loaded into ⅜ inch tubes onto the instrument. Sample tubes were immersed in a liquid nitrogen bath and evacuated. Leak tests were conducted, where after a total of eight relative pressure points were measured in a range from 0.08 to 0.98. Measured parameters were used by the instrument software to calculate the surface area.

1.2 Particle Size

The Particle size of the catalyst particles is determined using fine test sieves fitted with stainless steel wire cloth meeting ASTM specification E-11.

1.3 Catalyst Preparation Procedure

For the reverse precipitation of iron, up to 100 ml 25% (v/v) $NH_4OH$ solution was added drop-wise, whilst stirring with an overhead stirrer, to 400 ml of 1 M aqueous solution of $Fe(NO_3)_3 \cdot 9 H_2O$ (161.6 g) until a pH of 7 at room temperature (25° C.) was reached. Thereafter, $Na_2CO_3$ and the selected non-metal precursor, if present, were added in the appropriate amounts to the precipitation mixture. The resultant slurry was then dried in a fan-oven overnight (approximately 16 hours) at 150° C., and then calcined in air at 350° C. for 4 hours. Finally, the catalyst was crushed and screened to a particle size range of 38-150 μm. This was achieved by screening the catalyst over a 38 μm sieve and discarding the <38 μm fraction, followed by screening over a 150 μm sieve and discarding the >150 μm fraction using fine test sieves fitted with stainless steel wire cloth meeting ASTM specification E-11.

1.4 Catalyst Testing Procedure 25 mg calcined catalyst was loaded into a micro fixed bed reactor and reduced in situ under hydrogen at 420° C. for 16 hours at 20 bar. Thereafter, synthesis gas was introduced at a flow rate of 13 liters (n) per g catalyst per hour ($H_2$=57 volume %, CO=14 volume %, $CO_2$=11 volume %) at 20 bar total pressure and at a temperature of 330° C. Analysis of hydrocarbon products was performed using GC-FID, and permanent gas analysis was done by GC-TCD.

1.5 Selectivity

All selectivities are expressed as carbon-atom % selectivity and are not normalized. $CO_2$ formation is excluded in selectivity calculations.

2. Experiments

Comparative Example 1

Following the general catalyst preparation procedure described above a catalyst with a composition of 0.295 g Na per 100 g Fe was prepared and tested in a micro fixed bed reactor as described in the general catalyst testing procedure above. The synthesis results are summarized in Tables 1, 2, 3 and 4.

Comparative Example No 2

Following the general catalyst preparation procedure described above, except that $Na_2(CO_3)$ was not added, a catalyst with a composition of 0.05 g S per 100 g Fe was prepared and tested in a micro fixed bed reactor as described in the general catalyst testing procedure above. The synthesis results are summarized in Table 1, 2, 3 and 4

Example 3

Following the general catalyst preparation procedure described above a catalyst with a composition of 0.591 g Na per 100 g Fe and 0.12 g S per 100 g Fe was prepared and tested in a micro fixed bed reactor as described in the general catalyst testing procedure above. The sulphur precursor used was ammonium sulphate. The synthesis results are summarized in Table 1 and compared to Comparative Examples 1 and 2.

TABLE 1

|  | Comparative Example 1† 0.295 g Na/100 g Fe | Comparative Example 2† 0.05 g S/100 g Fe | Example 3* 0.591 g Na/ 0.12 g S/100 g Fe |
|---|---|---|---|
| $CO + H_2$ conversion | 54% | 43% | 41% |
| $CO + CO_2$ conversion | 50% | 38% | 40% |
| $CH_4$ selectivity | 9% | 38% | 9% |
| $C_2$-$C_4$ selectivity | 24% | 50% | 52% |
| $C_2$-$C_8$ selectivity | 52% | 55% | 76% |
| $C_{5+}$ selectivity | 58% | 8% | 34% |
| % olefins in $C_2$-$C_4$ fractions | 80% | 12% | 75% |

TABLE 1-continued

|  | Comparative Example 1† 0.295 g Na/100 g Fe | Comparative Example 2† 0.05 g S/100 g Fe | Example 3* 0.591 g Na/ 0.12 g S/100 g Fe |
|---|---|---|---|
| % alcohols in $C_2$-$C_4$ fractions | 12% | 4% | 15% |
| Surface area (unreduced catalyst) | 32.8 m²/g | 30.9 m²/g | 31.7 m²/g |

†estimated mass balance: 95%;
*estimated mass balance: 97%

Example 4

Following the general catalyst preparation procedure described above a catalyst with a composition of 0.31 g Na per 100 g Fe and 0.08 g P per 100 g Fe was prepared and tested in a micro fixed bed reactor as described in the general catalyst testing procedure above. The phosphorous precursor used was ammonium phosphate dibasic. The synthesis results are summarized in Table 2 and compared to Comparative Examples 1 and 2.

TABLE 2

|  | Comparative Example 1† 0.295 g Na/100 g Fe | Comparative Example 2† 0.05 g S/100 g Fe | Example 4* 0.31 g Na/ 0.08 g P/ 100 g Fe |
|---|---|---|---|
| $CO + H_2$ conversion | 54% | 43% | 44% |
| $CO + CO_2$ conversion | 50% | 38% | 41% |
| $CH_4$ selectivity | 9% | 38% | 10% |
| $C_2$-$C_4$ selectivity | 24% | 50% | 37% |
| $C_2$-$C_8$ selectivity | 52% | 55% | 62% |
| $C_{5+}$ selectivity | 58% | 8% | 45% |
| % olefins in $C_2$-$C_4$ fractions | 80% | 12% | 80% |
| % alcohols in $C_2$-$C_4$ fractions | 12% | 4% | 8% |

†estimated mass balance: 95%;
*estimated mass balance: 93%

Example 5

Following the general catalyst preparation procedure described above a catalyst with a composition of 0.369 g Na per 100 g Fe and 0.05 g B per 100 g Fe was prepared and tested in a micro fixed bed reactor as described in the general catalyst testing procedure methodology above. The boron precursor used was ammonium biborate tetrahydrate. The synthesis results are summarized in Table 3 and compared to Comparative Examples 1 and 2.

TABLE 3

|  | Comparative Example 1† 0.295 g Na/100 g Fe | Comparative Example 2† 0.05 g S/100 g Fe | Example 5* 0.369 g Na/ 0.05 g B/ 100 g Fe |
|---|---|---|---|
| $CO + H_2$ conversion | 54% | 43% | 47% |
| $CO + CO_2$ conversion | 50% | 38% | 43% |
| $CH_4$ selectivity | 9% | 38% | 9% |
| $C_2$-$C_4$ selectivity | 24% | 50% | 37% |
| $C_2$-$C_8$ selectivity | 52% | 55% | 67% |

TABLE 3-continued

|  | Comparative Example 1† 0.295 g Na/100 g Fe | Comparative Example 2† 0.05 g S/100 g Fe | Example 5* 0.369 g Na/ 0.05 g B/ 100 g Fe |
|---|---|---|---|
| $C_{5+}$ selectivity | 58% | 8% | 49% |
| % olefins in $C_2$-$C_4$ fractions | 80% | 12% | 82% |
| % alcohols in $C_2$-$C_4$ fractions | 12% | 4% | 6% |

†estimated mass balance: 95%;
*estimated mass balance: 95%

Example 6

Following the general catalyst preparation procedure described above a catalyst with a composition of 0.591 g Na per 100 g Fe and 0.1 g Sb per 100 g Fe was prepared and tested in a micro fixed bed reactor as described in the general catalyst testing methodology above. The antimony precursor used was antimony acetate. The synthesis results are summarized in Table 4 and compared to Comparative Examples 1 and 2.

TABLE 4

|  | Comparative Example 1† 0.295 g Na/ 100 g Fe | Comparative Example 2† 0.05 g S/100 g Fe | Example 6* 0.591 g Na/ 0.1 g Sb/100 g Fe* |
|---|---|---|---|
| $CO + H_2$ conversion | 54% | 43% | 41% |
| $CO + CO_2$ conversion | 50% | 38% | 39% |
| $CH_4$ selectivity | 9% | 38% | 7% |
| $C_2$-$C_4$ selectivity | 24% | 50% | 38% |
| $C_2$-$C_8$ selectivity | 52% | 55% | 67% |
| $C_{5+}$ selectivity | 58% | 8% | 49% |
| % olefins in $C_2$-$C_4$ fractions | 80% | 12% | 73% |
| % alcohols in $C_2$-$C_4$ fractions | 12% | 4% | 14% |

†estimated mass balance: 95%;
*estimated mass balance: 94%

Example 7

Following the general catalyst preparation procedure described above a catalyst with a composition of 0.29 g Na per 100 g Fe and 0.05 g S per 100 g Fe was prepared and tested in a micro fixed bed reactor as described in the general catalyst testing methodology above. The sulphur precursor used was ammonium sulphate. The synthesis results are summarized in Table 5 and compared to Example 3.

TABLE 5

|  | Example 7 0.29 g Na/0.05 g S/ 100 g Fe | Example 3 0.59 g Na/0.12 g S/ 100 g Fe |
|---|---|---|
| $CO + H_2$ conversion | 48% | 41% |
| $CO + CO_2$ conversion | 46% | 40% |
| $CH_4$ selectivity | 9% | 9% |
| $C_2$-$C_4$ selectivity | 47% | 52% |
| $C_2$-$C_8$ selectivity | 74% | 76% |
| $C_{5+}$ selectivity | 40% | 34% |
| % olefins in $C_2$-$C_4$ fractions | 74% | 75% |
| % alcohols in $C_2$-$C_4$ fractions | 15% | 15% |
| Surface area (unreduced catalyst) | 29.4 m²/g | 31.7 m²/g |

Example 8

The procedure for Example 7 was repeated except this time the reactor synthesis temperature was lowered from 330° C. to 300° C. The synthesis results are summarized in Table 6 and compared to Example 7.

TABLE 6

|  | Example 8 0.29 g Na/0.05 g S/ 100 g Fe | Example 7 0.29 g Na/0.05 g S/ 100 g Fe |
|---|---|---|
| $CO + H_2$ conversion | 34% | 48% |
| $CO + CO_2$ conversion | 30% | 46% |
| $CH_4$ selectivity | 8% | 9% |
| $C_2$-$C_4$ selectivity | 45% | 47% |
| $C_2$-$C_8$ selectivity | 66% | 74% |
| $C_{5+}$ selectivity | 40% | 40% |
| % olefins in $C_2$-$C_4$ fractions | 76% | 74% |
| % alcohols in $C_2$-$C_4$ fractions | 11% | 15% |
| Surface area (unreduced catalyst) | 29.4 m²/g | 29.4 m²/g |

Example 9

The procedure for Example 7 was repeated except this time the reactor synthesis temperature was raised from 330° C. to 360° C. The synthesis results are summarized in Table 7 and compared to Example 7.

TABLE 7

|  | Example 9 0.29 g Na/0.05 g S/ 100 g Fe | Example 7 0.29 g Na/0.05 g S/ 100 g Fe |
|---|---|---|
| $CO + H_2$ conversion | 52% | 48% |
| $CO + CO_2$ conversion | 47% | 46% |
| $CH_4$ selectivity | 10% | 9% |
| $C_2$-$C_4$ selectivity | 43% | 47% |
| $C_2$-$C_8$ selectivity | 64% | 74% |
| $C_{5+}$ selectivity | 34% | 40% |
| % olefins in $C_2$-$C_4$ fractions | 80% | 74% |
| % alcohols in $C_2$-$C_4$ fractions | 8% | 15% |
| Surface area (unreduced catalyst) | 29.4 m²/g | 29.4 m²/g |

Example 10

The procedure for Example 7 was repeated except for the total reactor pressure which was raised from 20 bar to 40 bar while the synthesis temperature was raised from 330 to 360° C. The synthesis results are summarized in Table 8.

TABLE 8

|  | Example 10 0.29 g Na/0.05 g S/ 100 g Fe |
| --- | --- |
| $CO + H_2$ conversion | 59% |
| $CO + CO_2$ conversion | 54% |
| $CH_4$ selectivity | 13% |
| $C_2$-$C_4$ selectivity | 45% |
| $C_2$-$C_8$ selectivity | 64% |
| $C_{5+}$ selectivity | 29% |
| % olefins in $C_2$-$C_4$ fractions | 72% |
| % alcohols in $C_2$-$C_4$ fractions | 10% |
| Surface area (unreduced catalyst) | 29.4 $m^2/g$ |

Example 11

Following the general catalyst preparation procedure described above a catalyst with a composition of 0.8 g K per 100 g Fe and 0.2 g S per 100 g Fe was prepared and tested in a micro fixed bed reactor as described in the general catalyst testing procedure described above. In this case the synthesis temperature was raised to 360° C. and the total reactor pressure was increased to 40 bar. The synthesis results are summarized in Table 9 and compared to Example 10 which was tested under identical conditions.

TABLE 9

|  | Example 11 0.8 g K/0.2 g S/ 100 g Fe | Example 10 0.29 g Na/0.05 g S/ 100 g Fe |
| --- | --- | --- |
| $CO + H_2$ conversion | 12% | 59% |
| $CO + CO_2$ conversion | 14% | 54% |
| $CH_4$ selectivity | 12% | 13% |
| $C_2$-$C_4$ selectivity | 50% | 45% |
| $C_2$-$C_8$ selectivity | 66% | 64% |
| $C_{5+}$ selectivity | 33% | 29% |
| % olefins in $C_2$-$C_4$ fractions | 74% | 72% |
| % alcohols in $C_2$-$C_4$ fractions | 10% | 10% |

3.1 Catalyst Preparation Procedure A (Inventive Example 1A)

For the reverse precipitation of iron, up to 100 ml 25% (v/v) $NH_4OH$ solution was added drop-wise, whilst stirring with an overhead stirrer, to 400 ml of 1 M aqueous solution of $Fe(NO_3)_3.9H_2O$ (161.6 g) containing the appropriate amount of the selected non-metal precursor of promoter P1 until a pH of 7 at room temperature (25° C.) was reached. Thereafter, $Na_2CO_3$ was added in the appropriate amounts to the precipitation mixture. The resultant slurry was then dried in a fan-oven overnight (approximately 16 hours) at 150° C., and then calcined in air at 350° C. for 4 hours. Finally, the catalyst was crushed and screened to a particle size range of 38-150 μm. This was achieved by screening the catalyst over a 38 μm sieve and discarding the <38 μm fraction, followed by screening over a 150 μm sieve and discarding the >150 μm fraction using fine test sieves fitted with stainless steel wire cloth meeting ASTM specification E-11.

3.2 Catalyst Preparation Procedure B (Example 2A)

For the reverse precipitation of iron, up to 100 ml 25% (v/v) $NH_4OH$ solution was added drop-wise, whilst stirring with an overhead stirrer, to 400 ml of 1 M aqueous solution of $Fe(NO_3)_3.9H_2O$ (161.6 g) until a pH of 7 at room temperature (25° C.) was reached. Thereafter, $Na_2CO_3$ was added in the appropriate amounts to the precipitation mixture. The resultant slurry was then dried in a fan-oven overnight (approximately 16 hours) at 150° C., and then calcined in air at 350° C. for 4 hours. The catalyst was then crushed and screened to a particle size range of 38-150 μm using fine test sieves fitted with stainless steel wire cloth meeting ASTM specification E-11. Thereafter the iron oxide particles were suspended in a water mixture containing the appropriate amount of the selected non-metal precursor of promoter P1 and agitated for approximately 30 minutes. The resultant slurry was then dried in a fan-oven overnight (approximately 16 hours) at 150° C., and again calcined in air at 350° C. for 4 hours.

3.3 Catalyst Preparation Procedure C (Comparative Example 3A)

For the reverse precipitation of iron, up to 100 ml 25% (v/v) $NH_4OH$ solution was added drop-wise, whilst stirring with an overhead stirrer, to 400 ml of 1 M aqueous solution of $Fe(NO_3)_3.9H_2O$ (161.6 g) until a pH of 7 at room temperature (25° C.) was reached. Thereafter, $Na_2CO_3$ was added in the appropriate amounts to the precipitation mixture. The resultant slurry was then dried in a fan-oven overnight (approximately 16 hours) at 150° C., and then calcined in air at 350° C. for 4 hours. Finally, the catalyst was crushed and screened to a particle size range of 38-150 μm using fine test sieves fitted with stainless steel wire cloth meeting ASTM specification E-11.

3.4 Catalyst Preparation Procedure D Using Spray Drying (Example 6A)

Iron nitrate salt [$Fe(NO_3)_3.9H_2O$] was dissolved in water to a concentration of 200 g Fe/litre. The solution was promoted with 0.4 g Na/100 g Fe by using Sodium carbonate ($Na_2CO_3$) and with 0.11 g S/100 g Fe by using ammonium sulphate. This solution was spray dried on a Niro Production Minor spray dryer with an inlet temperature of 390° C. and outlet temperature of 140° C. A TX2.5 Unijet hollow cone spray nozzle tip was used to atomize the feed solution. At a pressure of 15 bar, the feed rate was approximately 19.8 litres/hour. A Hydra-cell G-13 positive displacement diaphragm feed pump was used to feed the high-pressure nozzle. The catalyst was calcined at 350° C. for 4 hours.

3.5 Catalyst Testing Procedure 5 g calcined catalyst was loaded into a berty type gradientless micro fixed bed reactor and reduced in situ under hydrogen at 420° C. for 16 hours at 20 bar. Thereafter, synthesis gas was introduced at a flow rate of 13 liters (n) per g catalyst per hour ($H_2$=57 volume %, CO=14 volume %, $CO_2$=11 volume %) at 20 bar total pressure and at a temperature of 330° C. Analysis of hydrocarbon products was performed using GC-FID, and permanent gas analysis was done by GC-TCD.

3.6 Selectivity

All selectivities are expressed as carbon-atom % selectivity and are not normalized. $CO_2$ formation is excluded in selectivity calculations.

4. Experiments

Inventive Example 1A

Following the general catalyst preparation procedure A described in item 3.1 above, a catalyst with a composition of 0.419 g Na per 100 g Fe and 0.112 g S per 100 g Fe was prepared and tested in a Berty type gradientless micro reactor as described in the general catalyst testing methodology (item 3.5) above. The sulphur precursor used was ammonium sulphate. The synthesis results are summarized in Table 10.

Example 2A

Following the general catalyst preparation procedure B described in item 3.2 above a catalyst with a composition of 0.419 g Na per 100 g Fe and 0.112 g S per 100 g Fe was prepared and tested in a Berty type gradientless micro reactor as described in the general catalyst testing methodology (item 3.5) above. The sulphur precursor used was ammonium sulphate. The synthesis results are summarized in Table 10.

Comparative Example 3A

Following the general catalyst preparation procedure C described in item 3.3 above a catalyst with a composition of 0.295 g Na per 100 g Fe was prepared and tested in a Berty type gradientless microreactor as described in the general catalyst testing procedure (item 3.5) above. The synthesis results are summarized in Table 10.

TABLE 10

|  | Example 1A† | Example 2A* | Comparative Example 3A† |
|---|---|---|---|
| Na | 0.419 g | 0.419 g | 0.295 g |
| S | 0.112 g | 0.112 g | — |
| Fe | 100 g | 100 g | 100 g |
| $CO + H_2$ conversion | 33.5% | 39.8% | 46% |
| $CO + CO_2$ conversion | 33.9% | 38.3% | 44% |
| $CH_4$ selectivity | 10.8% | 14.1% | 10% |
| C2-C4 selectivity | 59.3% | 58.2% | 34% |
| C2-C8 selectivity | 76.4% | 78.6% | 60% |
| C5+ selectivity | 22.3% | 24.5% | 46% |
| olefins in C2-C4 fraction | 61.6% | 63.7% | 70% |
| alcohols in C2-C4 fraction | 22.1% | 15.8% | 13% |
| paraffins in C2-C4 fraction | 9.7% | 14.3% | 17% |
| Surface area (unreduced catalyst) | 27 m$^2$/g | 15 m$^2$/g | 32.8 m$^2$/g |

†Estimated mass balance: 95%;
*Estimated mass balance: 97%

Example 4A

Following the general catalyst preparation procedure D described in item 3.4 above a catalyst with a composition of 0.52 g Na per 100 g Fe and 0.1 g S per 100 g Fe was prepared and tested in a Berty type gradientless micro reactor as described in the general catalyst testing procedure (item 3.5) above. The synthesis results are summarized in Table 11.

TABLE 11

|  | Example 4A 0.52 g Na/0.1 g S/100 g Fe |
|---|---|
| $CO + H_2$ conversion | 36.6% |
| $CO + CO_2$ conversion | 41.8% |
| $CH_4$ selectivity | 12.2% |
| C2-C4 selectivity | 59.0% |
| C2-C8 selectivity | 80.4% |
| C5+ selectivity | 28.6% |
| % olefins in C2-C4 fraction | 53.0% |
| % alcohols in C2-C4 fraction | 37.0% |
| % paraffins in C2-C4 fraction | 5.3% |

Discussion of the Results in Tables 1 to 11:

Surprisingly, when comparing the synthesis performance of the catalyst of Comparative Example 1 with the catalysts promoted by a series of non-metals in combination with alkali metal, it will be noted that the methane selectivity remained relatively constant while a dramatic increase in selectivity for light hydrocarbons ($C_2$-$C_4$ hydrocarbon fraction) was observed.

The invention claimed is:
1. A hydrocarbon synthesis catalyst comprising:
   an unreduced form comprising:
      a) Fe as catalytically active metal,
      b) a first promoter comprising an alkali metal and/or an alkaline-earth metal, the alkali metal and/or alkaline-earth metal being present in a combined amount of 0.1 to 1.0 g/100 g Fe,
      c) a second promoter comprising a metalloid, the metalloid being antimony, present in an amount of 0.03 to 0.2 g/100 g Fe,
      d) a surface area of 80 m$^2$/g or less, and
      e) a weight ratio of the first promoter to the second promoter of 0.8:1 to 20:1; and
   a reduced form comprising:
      a chemical bond between the at least one metal of the first promoter and the metalloid of the second promoter, and wherein at least 75 wt. % of the Fe is in the zero oxidation state.

2. The hydrocarbon synthesis catalyst according to claim 1 wherein the amount of Fe in the reduced form of the catalyst is from 50 to 99.0 wt %.

3. The hydrocarbon synthesis catalyst according to claim 1 wherein the metal of the first promoter is present in the unreduced form of the catalyst in an amount of 0.1 to 0.6 g/100 g Fe.

4. The hydrocarbon synthesis catalyst according to claim 1 wherein the first promoter comprises at least one of Na and K.

5. The hydrocarbon synthesis catalyst according to claim 1 wherein the metalloid is present in the unreduced form of the catalyst in an amount of from 0.05 to 0.15 g/100 g Fe.

6. A catalyst obtained by the following process steps:
   (a) providing a precipitation mixture comprising:
      a precipitated, non-calcined iron-containing solid;
      an aqueous solvent; and
      a precursor of a first promoter, the precursor comprising a metalloid which is antimony,
   (b) removing the aqueous solvent from the precipitation mixture while retaining the metalloid of the first precursor,
   (c) subjecting the product of step (b) to a calcination treatment to form a calcined catalyst, the calcined catalyst comprising an amount of the metalloid of the precursor of the first promoter present in an amount of 0.03 to 0.2 q/100 g Fe,
   (d) providing a precursor of a second promoter to the calcined catalyst, the second precursor comprising an alkali metal and/or an alkaline-earth metal, the second precursor provided to the calcined catalyst by at least one of the following steps:
      adding the second precursor to the precipitation mixture and retaining the metal of the second precursor while removing the aqueous solvent from the precipitation mixture;
      adding the second precursor to the precipitation mixture after the aqueous solvent has been removed; and
      adding the second precursor to the calcined catalyst, wherein the precursor of the second promoter is provided in amount sufficient to provide in the calcined catalyst a ratio of the metal of the second precursor to the amount of the metalloid of the first precursor of 0.8:1 to 20:1, and (e) reducing the calcined catalyst comprising the precursor of the second promoter, wherein the reduced form of the catalyst comprises a chemical bond between the metal of the second promoter and the metalloid of the first promoter, and wherein at least 75 wt. % of the Fe is in the zero oxidation state.

7. A hydrocarbon synthesis process which is operated in the presence of a catalyst according to claim 1 or 6, wherein the catalyst is in its reduced form.

8. The process according to claim 7 which is a Fischer-Tropsch process.

9. A process comprising
a hydrocarbon synthesis process which is operated in the presence of a catalyst according to claim 1 or 6, wherein the catalyst is in its reduced form; and
further processing of the obtained hydrocarbon product.

* * * * *